United States Patent
Azimi

(10) Patent No.: US 9,519,598 B1
(45) Date of Patent: *Dec. 13, 2016

(54) HIGH LATENCY INTERFACE BETWEEN HARDWARE COMPONENTS

(75) Inventor: Saeed Azimi, Union City, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,510

(22) Filed: Feb. 24, 2012

Related U.S. Application Data

(63) Continuation of application No. 12/858,457, filed on Aug. 18, 2010, now Pat. No. 8,127,067, which is a continuation of application No. 12/214,186, filed on Jun. 16, 2008, now Pat. No. 7,783,815, which is a continuation of application No. 11/311,848, filed on Dec. 19, 2005, now Pat. No. 7,389,374, which is a continuation of application No. 10/962,321, filed on Oct. 12, 2004, now Pat. No. 7,171,507, which is a continuation of application No. 09/661,912, filed on Sep. 14, 2000, now Pat. No. 6,871,251.

(60) Provisional application No. 60/205,594, filed on May 17, 2000.

(51) Int. Cl.
G06F 13/14 (2006.01)

(52) U.S. Cl.
CPC ..................... *G06F 13/14* (2013.01)

(58) Field of Classification Search
USPC ...... 710/33, 34, 62, 300, 305, 306; 711/112; 714/769
See application file for complete search history.

(56) References Cited

U.S. PATENT DOCUMENTS

| | | |
|---|---|---|
| 3,571,806 A | 3/1971 | Makie et al. |
| 4,346,440 A | 8/1982 | Kyu et al. |
| 4,607,348 A | 8/1986 | Sheth |
| 4,771,378 A | 9/1988 | Halford |
| 4,779,196 A | 10/1988 | Manga |
| 4,803,567 A | 2/1989 | Wilkinson et al. |
| 5,121,262 A | 6/1992 | Squires et al. |
| 5,133,060 A | 7/1992 | Weber et al. |
| 5,151,999 A | 9/1992 | Marzucco et al. |
| 5,164,867 A | 11/1992 | Hagiwara et al. |
| 5,218,686 A | 6/1993 | Thayer |
| 5,218,689 A * | 6/1993 | Hotle ............................ 711/114 |

(Continued)

OTHER PUBLICATIONS

Hans-Peter Messmer, "The Indispensable PC Hardware Book", 1995, Addison-Wesley Publishers, Ltd., 2nd Ed. pp. 1072-1077.

(Continued)

*Primary Examiner* — Khanh Dang

(57) ABSTRACT

A system includes a hard disk controller and a read/write channel. The hard disk controller is configured to transmit a first gate signal, a write clock signal, mode selection data, and first data to be stored on a storage medium, and receive a read clock signal and second data stored on the storage medium. The read/write channel is configured to receive the first gate signal, the write clock signal, the mode selection data, and the first data, transmit the read clock signal, transfer the second data from the storage medium to the hard disk controller based on the mode selection data and the read clock signal, and transfer the first data from the hard disk controller to the storage medium based on the mode selection data and the write clock signal.

16 Claims, 9 Drawing Sheets

(56) References Cited

U.S. PATENT DOCUMENTS

| | | | |
|---|---|---|---|
| 5,228,129 A | 7/1993 | Bryant et al. | |
| 5,235,683 A | 8/1993 | Dahlerud | |
| 5,264,958 A | 11/1993 | Johnson | |
| 5,274,772 A | 12/1993 | Dunn et al. | |
| 5,313,340 A | 5/1994 | Takayama et al. | |
| 5,339,395 A | 8/1994 | Pickett et al. | |
| 5,444,857 A | 8/1995 | Rowland | |
| 5,544,334 A | 8/1996 | Noll | |
| 5,555,380 A | 9/1996 | Suzuki | |
| 5,561,823 A | 10/1996 | Anderson | |
| 5,564,027 A | 10/1996 | Bui et al. | |
| 5,568,470 A | 10/1996 | Ben-Nun et al. | |
| 5,592,632 A | 1/1997 | Leung et al. | |
| 5,592,682 A | 1/1997 | Chejlava et al. | |
| 5,596,737 A | 1/1997 | Strang, Jr. | |
| 5,603,052 A | 2/1997 | Chejlava et al. | |
| 5,613,136 A | 3/1997 | Casavant et al. | |
| 5,652,848 A | 7/1997 | Bui et al. | |
| 5,675,829 A | 10/1997 | Oskouy et al. | |
| 5,694,614 A | 12/1997 | Bennett | |
| 5,758,191 A | 5/1998 | Kasebayashi et al. | |
| 5,802,554 A | 9/1998 | Caceres et al. | |
| 5,835,144 A | 11/1998 | Matsumura et al. | |
| 5,838,934 A | 11/1998 | Boutaud et al. | |
| 5,844,920 A | 12/1998 | Zook et al. | |
| 5,905,601 A | 5/1999 | Tsunoda | |
| 5,920,709 A | 7/1999 | Hartung et al. | |
| 5,963,386 A | 10/1999 | Assouad | |
| 5,987,542 A | 11/1999 | Bang | |
| 6,009,549 A | 12/1999 | Bliss et al. | |
| 6,034,829 A | 3/2000 | Suzuki et al. | |
| 6,075,663 A | 6/2000 | Chae | |
| 6,088,754 A | 7/2000 | Chapman | |
| 6,112,268 A * | 8/2000 | Ohashi et al. | 710/52 |
| 6,147,826 A * | 11/2000 | Hashimura | 360/53 |
| 6,167,461 A | 12/2000 | Keats et al. | |
| 6,178,057 B1 | 1/2001 | Kuroda et al. | |
| 6,272,589 B1 | 8/2001 | Aoki | |
| 6,278,568 B1 | 8/2001 | Cloke et al. | |
| 6,286,061 B1 | 9/2001 | Ross | |
| 6,298,408 B1 | 10/2001 | Park | |
| 6,301,633 B1 | 10/2001 | Chapman | |
| 6,378,007 B1 | 4/2002 | Southwell | |
| 6,393,506 B1 | 5/2002 | Kenny | |
| 6,407,913 B1 | 6/2002 | Peachey et al. | |
| 6,513,105 B1 | 1/2003 | Pontius | |
| 6,519,667 B2 | 2/2003 | Kondo et al. | |
| 6,539,439 B1 | 3/2003 | Nguyen et al. | |
| 6,556,365 B2 | 4/2003 | Satoh | |
| 6,581,141 B1 | 6/2003 | Kelley et al. | |
| 6,636,906 B1 | 10/2003 | Sharma et al. | |
| 6,668,290 B1 | 12/2003 | Nelson | |
| 6,671,114 B2 | 12/2003 | Bang | |
| 6,711,225 B1 | 3/2004 | Sutardja et al. | |
| 6,757,698 B2 | 6/2004 | McBride et al. | |
| 6,871,251 B1 | 3/2005 | Azimi | |
| 6,931,473 B2 | 8/2005 | Graham et al. | |
| 7,110,200 B2 | 9/2006 | Tomimoto | |
| 7,117,498 B2 | 10/2006 | Li | |
| 7,171,507 B2 | 1/2007 | Azimi | |
| 7,281,065 B1 | 10/2007 | Lam et al. | |
| 7,389,374 B1 | 6/2008 | Azimi | |
| 7,487,268 B1 | 2/2009 | Lam et al. | |
| 7,783,815 B1 | 8/2010 | Azimi | |
| 8,127,067 B1 | 2/2012 | Azimi | |

OTHER PUBLICATIONS

Lee, ChangHwan, "IEEE Standard 1394 Serila Bus", 1998, Pusan National University, 8 pages.

Tiberiu Chelcea and Steven Nowick, "A Low-Latency FIFO for Mixed-Clock Systems", 2000, IEEE, VLSI, 2000 Proceedings, IEEE Computer Society Workshop, 45 pages.

* cited by examiner

HIGH LATENCY INTERFACE BETWEEN HARDWARE COMPONENTS

CROSS-REFERENCE TO RELATED APPLICATIONS

This application is a continuation of U.S. patent application Ser. No. 12/858,457, filed Aug. 18, 2010 (now U.S. Pat. No. 8,127,067), which is a continuation of U.S. patent application Ser. No. 12/214,186, filed Jun. 16, 2008 (now U.S. Pat. No. 7,783,815), which is a continuation of U.S. patent application Ser. No. 11/311,848 (now U.S. Pat. No. 7,389,374), filed Dec. 19, 2005, which is a continuation of U.S. patent application Ser. No. 10/962,321 (now U.S. Pat. No. 7,171,507), filed Oct. 12, 2004, which is a continuation of Ser. No. 09/661,912 (now U.S. Pat. No. 6,871,251), filed Sep. 14, 2000, which further claims the benefit of U.S. Provisional Application No. 60/205,594, filed May 17, 2000, the entire contents of each of which are hereby incorporated by reference herein.

FIELD

The present disclosure relates to a versatile, latency-independent interface between hardware components, such as between a read/write (R/W) channel or read channel (RDC) and a hard disk controller (HDC). Such an interface is flexible enough to support high read and write latencies of greater than one sector, a split sector format, and a second sector mark.

BACKGROUND

The statements in this section merely provide background information related to the present disclosure and may not constitute prior art.

As is shown in FIG. 1, a typical disk drive system includes a hard disk controller (HDC) 12 that interfaces with a R/W channel or RDC 14 which is in communication with a disk 16. Data transfer between the HDC and the R/W channel is synchronized by read gate (RGATE) and write gate (WGATE) control signals. In a read operation, R/W channel 14 processes an incoming analog signal from disk 16 and transfers the data to HDC 12. In a write operation, data is transferred from the HDC to the R/W channel to be written to the disk. Latency refers to the time or byte delay that data remains in the R/W channel. Some disk drive systems have latencies of about 20 bytes which, depending on the particular system, amounts to a time delay of between about 800 ns and 5 ms.

Technology such as iterative turbo coding, which is being introduced into modern disk drive systems, requires more processing before the data is available, which, in turn, requires R/W channels or RDCs with higher latencies. One problem is that the interface used in the shorter latency systems is not capable of supporting the higher latencies. Accordingly, a new interface is needed that supports higher latency R/W channel or RDC designs.

SUMMARY

It is therefore an object of the present invention to provide an interface between hardware components, such as between an HDC and a R/W channel or RDC, that supports relatively high read and write latencies.

It is another object of this invention to provide an interface signaling protocol which is flexible enough to support high read and write latencies of greater than one sector, and which supports a split sector format and multiple sector marks.

According to one aspect of the invention, a latency-independent interface between first and second hardware components is provided. Such a latency-independent interface comprises a data gate circuit that transmits a data gate signal; a data circuit that transmits or receives data under the control of the data gate signal; a media gate circuit that transmits a media gate signal; a mode selection circuit that transmits mode selection information under the control of the media gate signal; and a buffer attention circuit that receives a buffer attention signal.

In another aspect, the invention involves a latency-independent interface between first and second hardware components, which comprises a data gate circuit that receives a data gate signal; a data circuit that transmits or receives data under the control of the data gate signal; a media gate circuit that receives a media gate signal; a mode selection circuit that receives mode selection information under the control of the media gate signal; and a buffer attention circuit that transmits a buffer attention signal.

In yet another aspect of the invention, a latency-independent interface between first and second hardware components is provided. Such a latency-independent interface comprises a first data gate circuit that transmits a data gate signal; a first data circuit that transmits or receives data under the control of the data gate signal; a first media gate circuit that transmits a media gate signal; a first mode selection circuit that transmits mode selection information under the control of the media gate signal; a first buffer attention circuit that receives a buffer attention signal; a second data gate circuit that receives the data gate signal; a second data circuit that transmits or receives data under the control of the data gate signal; a second media gate circuit that receives the media gate signal; a second mode selection circuit that receives mode selection information under the control of the media gate signal; and a second buffer attention circuit that transmits a buffer attention signal.

Preferably, the mode selection information comprises tag information and control information. More preferably, the tag information comprises a tag command that identifies a location of associated data, and the control information comprises commands that indicate whether associated data is continued from a previous location or from a new location, a reset command, and size information including a size command that indicates size of associated data.

In other aspects, the invention embraces methods of transmitting and receiving signals between first and second hardware components corresponding to each of the interface devices set forth above. Such methods and/or steps thereof may be implemented by a program of instructions (e.g., software) embodied on a device-readable medium, such as a magnetic tape or disk, or optical medium that may be used to store such instructions. More broadly, the device-readable medium may include signals transmitted over network paths, infrared signals, as well as other signals throughout the electromagnetic spectrum that may be used to convey instructions. The instructions may be executed by a computer or other processor-controlled device. The program of instructions may also be in the form of hardware, or combination of software and hardware.

Still other aspects of the invention include interface protocols between at least two hardware components corresponding to each of the interface devices set forth above.

Other objects and attainments together with a fuller understanding of the invention will become apparent and appreciated by referring to the following description and claims taken in conjunction with the accompanying drawings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4A:
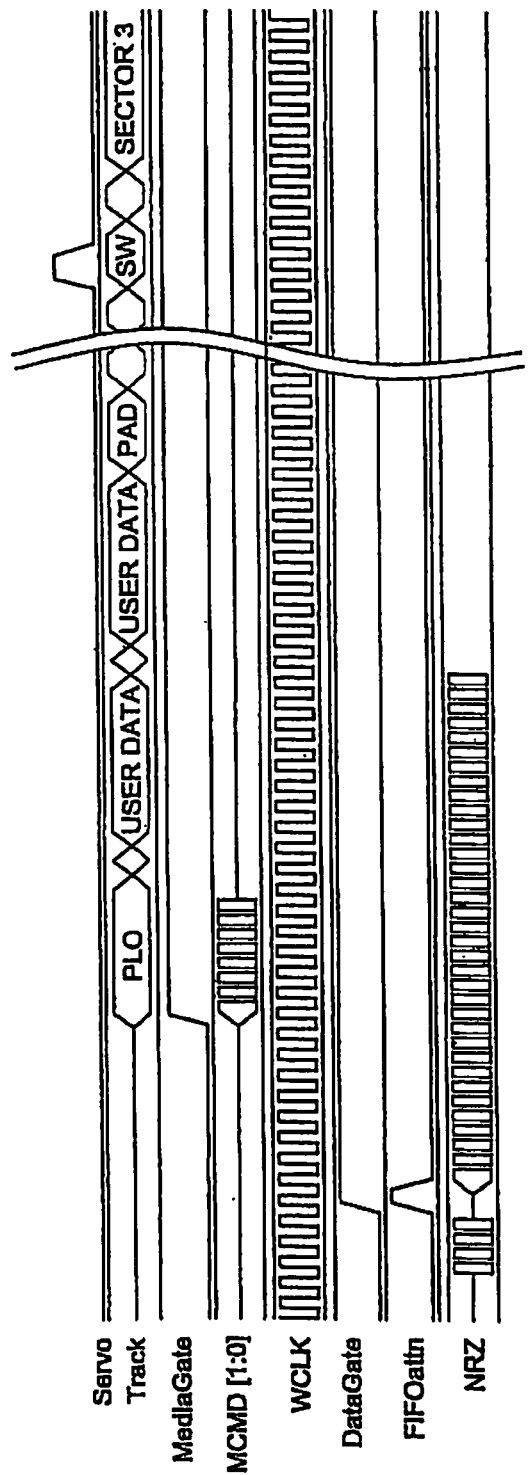

FIGS. 4(a), (b) and (c) are timing diagrams for high latency write operation, in accordance with embodiments of the invention.

Figure 5A:
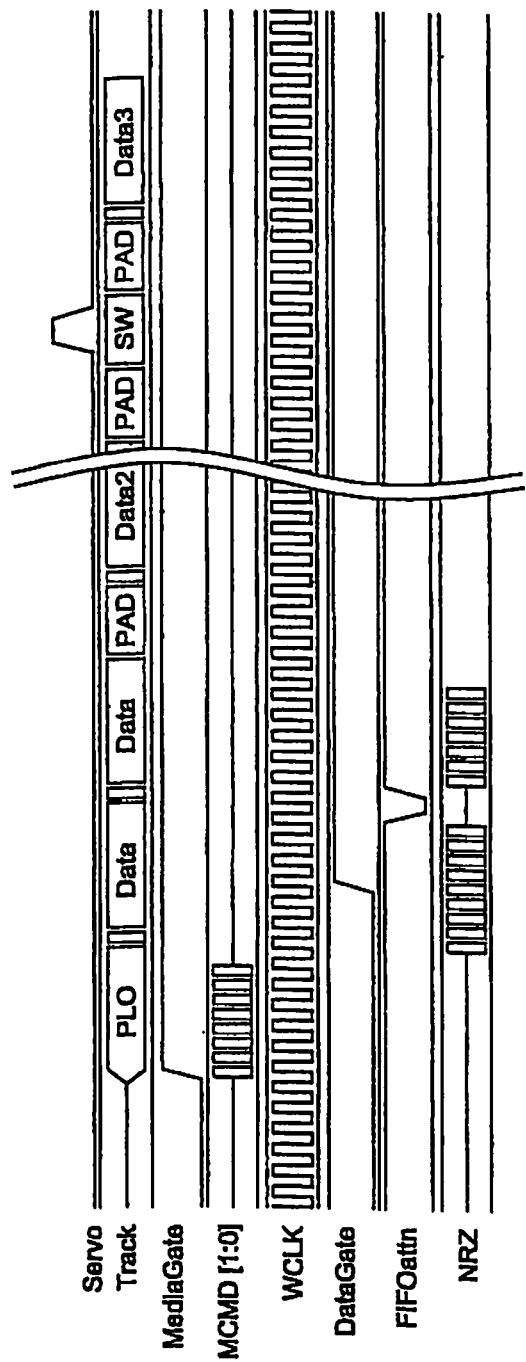

FIGS. 5(a), (b) and (c) are timing diagrams for high latency read operation, in accordance with embodiments of the invention.

DETAILED DESCRIPTION

Figure 1:
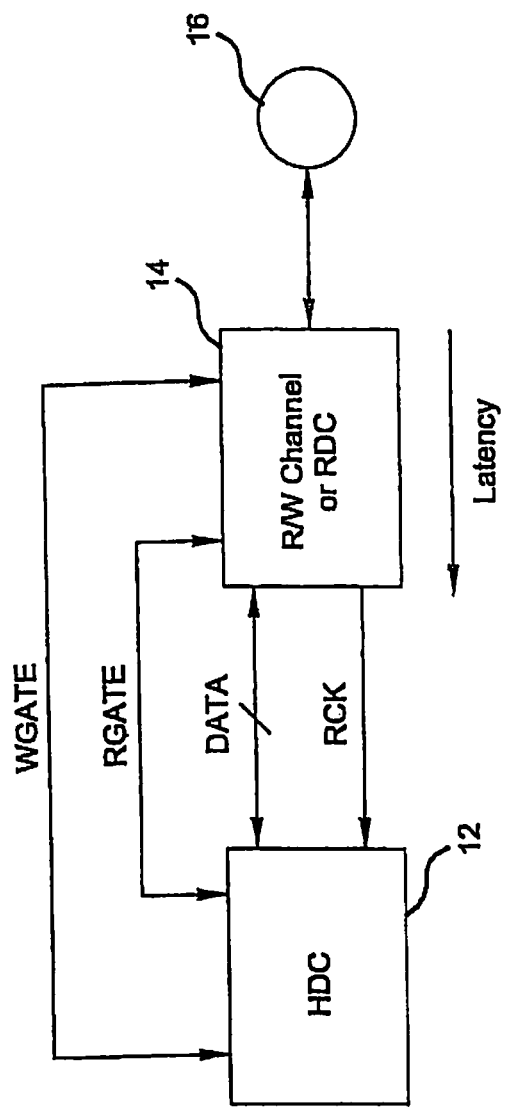
FIG. 1 is a block diagram of a conventional RDC/HDC interface.
Figure 2:
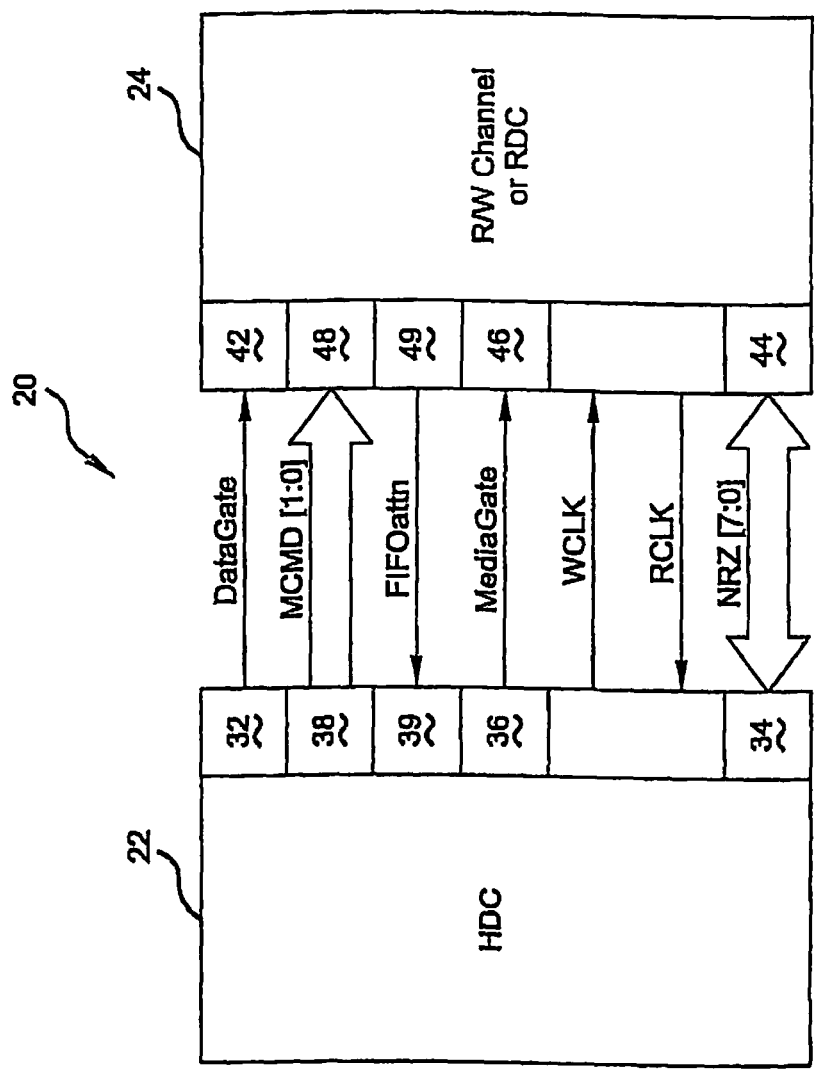
FIG. 2 is a block diagram of an interface between two hardware components, such as an HDC and an RDC or R/W channel, in accordance with embodiments of the invention.

Referring to FIG. 2, a block diagram of an interface 20 between a first hardware component 22 and a second hardware component 24, in accordance with embodiments of the invention, is illustrated. In a preferred embodiment, first hardware component 22 is a hard disk controller (HDC) and second hardware component 14 is a read/write (R/W) channel or read channel (RDC), although the invention is not so limited. Rather, interface 20 of the present invention may be employed in connection with other suitable functional hardware components between which data is transferred.

In accordance with the invention, interface 20 employs a new signaling protocol which decouples the timing of the conventional read and write gate control signals with the transfer of data by replacing those signals with a MediaGate signal, as described below. The interface supports read and write latencies of more than a sector long. The interface also supports split sector format (i.e., noncontiguous sectors of data) and multiple sector marks.

In the illustrated embodiment, the interface 20 of the present invention employs a read clock signal (RCLK) sourced from the R/W channel and output during read operations, and a write clock signal (WCLK) sourced from the HDC and output during write operations.

In accordance with the invention, interface 20 further includes two buses and two respectively associated control signals. A data gate signal (DataGate), sourced from the HDC, is synchronous with, and controls, NRZ data transfer between the R/W channel and the HDC via a bi-directional data bus. In one embodiment, the data bus (NRZ [7:0]) is byte-wide, with bits 0-7 represented by NRZ [0]-NRZ [7]. However, the data bus of the present invention may accommodate more or less than eight bits. The data signal may also include a parity bit, which in a byte-wide signal may be represented by NRZ [8].

A media gate signal (MediaGate) is provided which, as previously noted, replaces the conventional read and write gate control signals. MediaGate is sourced from the HDC and indicates the location of particular sectors on the track media. MediaGate is used to control data transfer between the disk and the R/W channel and is associated with a mode selection bus MCMD [1:0] that provides mode selection information to the R/W channel. Such mode selection information includes tag, control and size information. More specifically, such mode selection information includes commands such as "Tag ID" that identifies the sector in which the associated data is contained, "Cont" or "New" which indicates that the data is continued from the previous sector or from a new sector and "Reset" which resets the data transfer operation, and "Size" which indicates the byte size of the data of bytes.

Another interface signal, FIFOattn, is sourced from the R/W channel and indicates channel FIFO status during write and read operations. When the channel FIFO becomes full during a write operation, FIFOattn is asserted (i.e., becomes high) to indicate that the channel FIFO is full and that no more data can be transferred from HDC at this time. In that situation, the HDC must pause and resume data transfer only after FIFOattn is de-asserted. During read operation, a high FIFOattn indicates that the channel FIFO is ready for data from the HDC. On the other hand, a low FIFOattn indicates that no data can be transferred, in which case the HDC must pause data transfer until FIFOattn is asserted.

Each of the HDC 22 and the R/W channel 24 include appropriate circuitry for transmitting and receiving the various signals, data and mode selection information between the two hardware components. For example, HDC 22 includes a data gate circuit 32 that transmits DataGate, and a data circuit 34 that transmits and receives data on the data bus under the control of DataGate. HDC 22 also includes a media gate circuit 36 that transmits MediaGate, and a mode selection circuit 38 that transmits mode selection information under the control of MediaGate. A buffer attention circuit 39 is provided for receiving FIFOattn. R/W channel 24 comprises corresponding circuit components, including a data gate circuit 42 that receives DataGate, and a data circuit 44 that transmits and receives data on the data bus under the control of DataGate. R/W channel 24 also includes a media gate circuit 46 that receives MediaGate, and a mode selection circuit 48 that receives mode selection information under the control of MediaGate. A buffer attention circuit 49 is provided for transmitting FIFOattn. Signal and data transmitting and receiving circuits are generally known, and based on the teachings provided herein, one skilled in the art would be able to construct and implement transmitting and receiving circuits to carry out the specific signaling protocol described herein.

A parity signal (not shown), sourced from the R/W channel, may be used during write mode as a parity error feedback for write data input. During read mode, the parity signal can be used to output a Thermal Asperity (TA) detector's flag.

Figure 3:
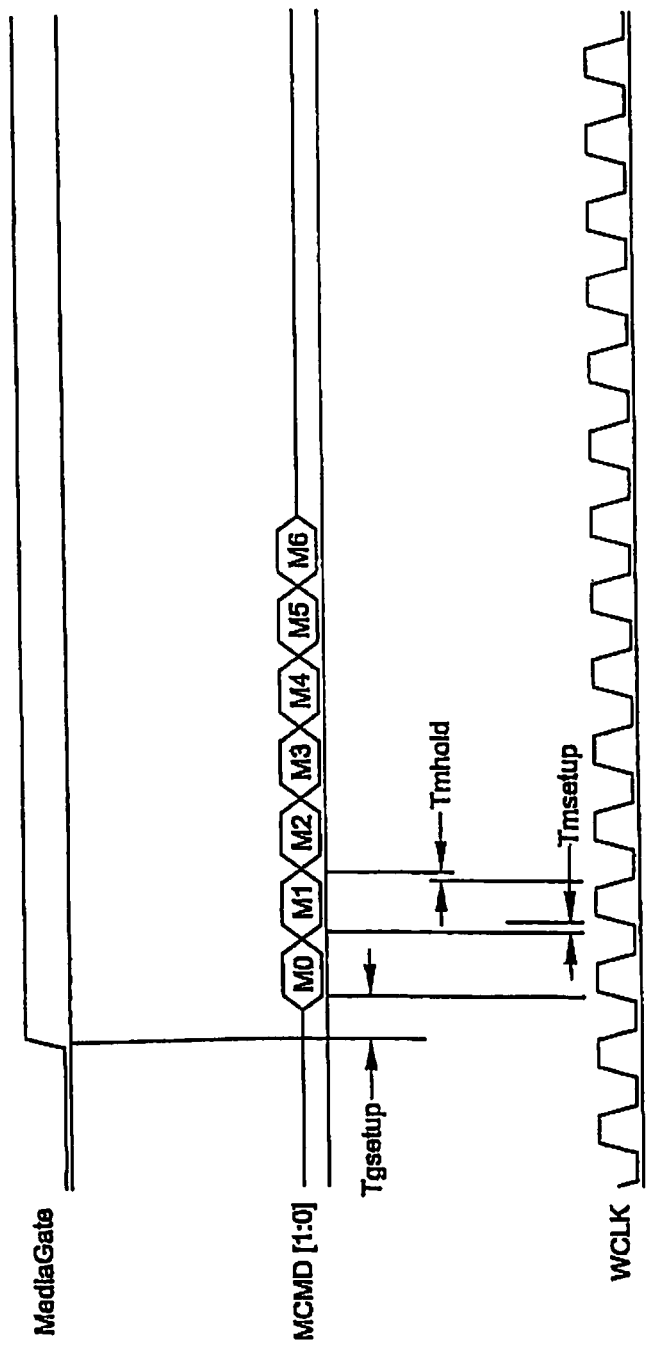
FIG. 3 is a timing diagram for write/read operations, in accordance with embodiments of the invention.

FIG. 3 is an exemplary timing diagram for write/read operations. Timing of the control signal MediaGate and its associated bus MCMD [1:0] are illustrated, along with WCLK.

In write/read operations, according to one embodiment, the R/W channel samples MCMD [1:0], received from the HDC, eight times in accordance with the WCLK/RCLK immediately after MediaGate is asserted. There are 2 bits/sample making a total of 16 bits. The R/W channel decodes the 16 bits of mode selection commands from the most significant bit to the least significant bit as set forth in Table 1 below.

TABLE 1

| Bits | Command | Description |
|---|---|---|
| MCMD [15:13] | Tag | 3 bits of Tag information (0-7) |
| MCMD [12] | Reset | 1 = Reset<br>Used for Read only |
| MCMD [11] | New/Cont | 0 = new sector<br>1 = continue previous sector |
| MCMD [10:0] | Size | Size in resolution of 4 bytes up to a maximum size of 8 Kbytes |

In addition to the commands listed in Table 1, commands indicating various error conditions may also be employed.

In write/read operations, the assertion of DataGate is synchronous with NRZ data transfer. The 5 lower bits of the conventional Sync byte are replaced with data command information (DCMD) on the data bus NRZ [7:0]. The R/W channel decodes the lower 5 bits of DCMD as set forth below in Table 2.

TABLE 2

| Bits | DCMD | Description |
|---|---|---|
| DCMD [4:2] | Tag | 3 bits of Tag information (0-7) |
| DCMD [1] | Reset | 1 = Reset<br>Used for Write only |
| DCMD [0] | New/Cont | 0 = new sector<br>1 = continue previous sector |

In addition to the commands listed in Table 2, a size command may also be used.

Regarding the operation of FIFOattn, for write operations, FIFOattn will be asserted by the R/W channel just before its FIFO becomes full. In particular, after FIFOattn is asserted (i.e., goes high), the RAN channel FIFO is able to accept one more byte from the HDC. After that, while FIFOattn remains high, the HDC assumes a pause state and does not resume data transfer until FIFOattn is de-asserted again.

For read operations, FIFOattn will be asserted by the R/W channel if its FIFO data is available to be transferred to the HDC. After FIFOattn is de-asserted (i.e., goes from high to low), the HDC can read one more byte of data. After that, while FIFOattn remains low indicating the RAN channel FIFO is not ready, the HDC assumes a pause state. Data transfer from the R/W channel to the HDC is not resumed until FIFOattn is asserted again.

Write Operation

A write operation is initiated by the HDC by asserting DataGate which is synchronous with the data transfer on NRZ [7:0]. The NRZ data is latched by the R/W channel on the rising edge of WCLK, as shown in FIG. 4. HDC provides additional mode selection commands (DCMD) using the lower 5 bits of the sync byte. The values of DCMD are set forth above in Table 2.

Figure 4B:
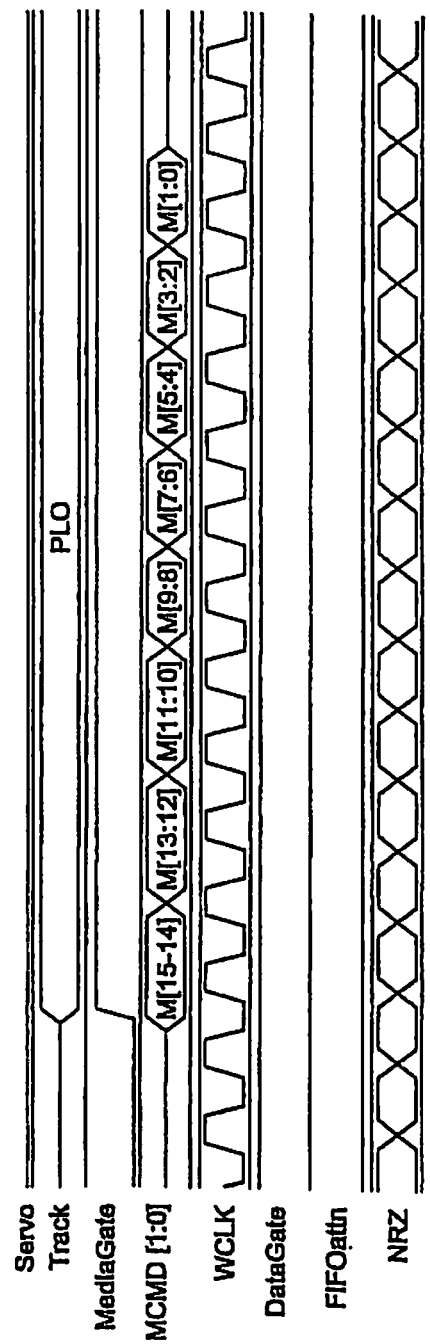
Figure 4C:
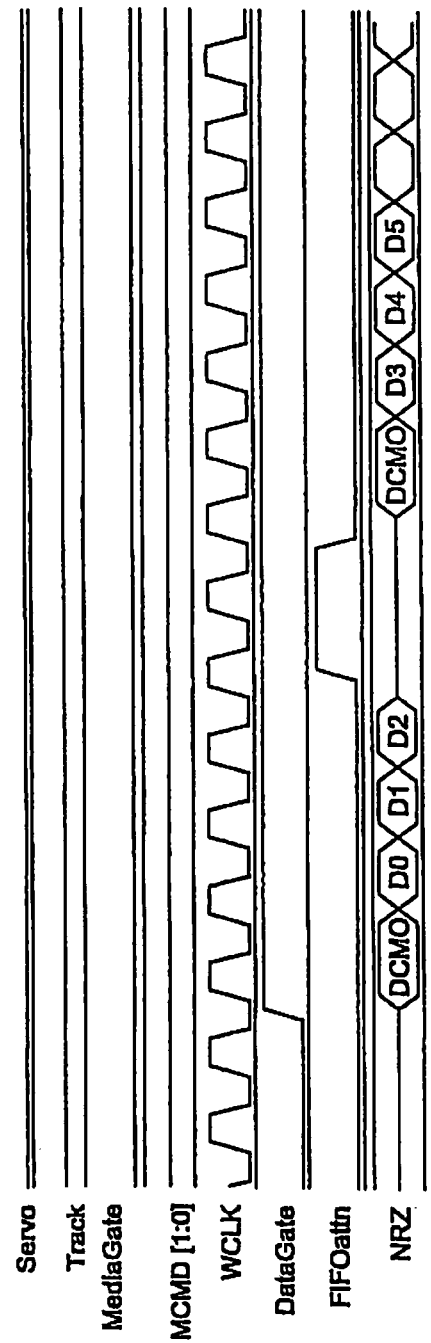

FIG. 4(a) illustrates the overall timing of signals including the interface signals in the write operation. The servo signal indicates where positioning information is located to maintain the center of the disk sensing element over a center of a track on the disk 16. The data is written on a specific track of the disk, and the track signal contains that information in a specific format required by the RDC. FIG. 4(b) is a "blow up" of that portion of FIG. 4(a) showing MCMD information transfer which occurs over the "PLO" field which is the period that RDC acquires phase lock to the incoming track signal. FIG. 4(c) is a "blow up" of that portion of FIG. 4(a) illustrating DCMD transfer which occurs over the beginning of the data transfer between HDC and RDC indicated by the rising edge of the DataGate signal.

In the case where the R/W channel FIFO is becoming full, with the high latency R/W channel of the present invention, FIFOattn will be asserted by the R/W channel when its FIFO has only one more location for data before it reaches an overflow condition. After detecting FIFOattn, HDC enters a pause state in which data transfer is temporarily halted. Data transfer is resumed only after FIFOattn is de-asserted. When data transfer is resumed the HDC also provides appropriate mode selection commands (DCMD).

The HDC provides additional information to the R/W channel on MediaGate, MCMD0 and MCMD1. After receiving the size information and matching the Tag IDs (DCMD and MCMD tag fields), the R/W channel can write data to the medium (e.g., the disk). The "New" command is issued for the beginning of a sector of data, while "Cont" is issued for the remaining data of a split sector. The HDC may use the "Reset" command to reset/reinitialize the R/W channel FIFO pointer.

Read Operation

Figure 5B:
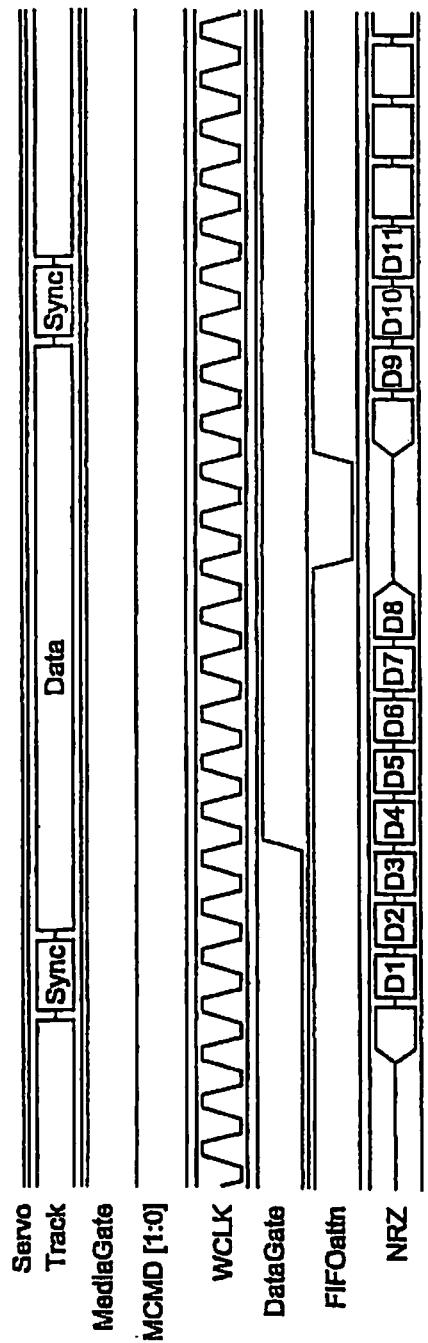
Figure 5C:
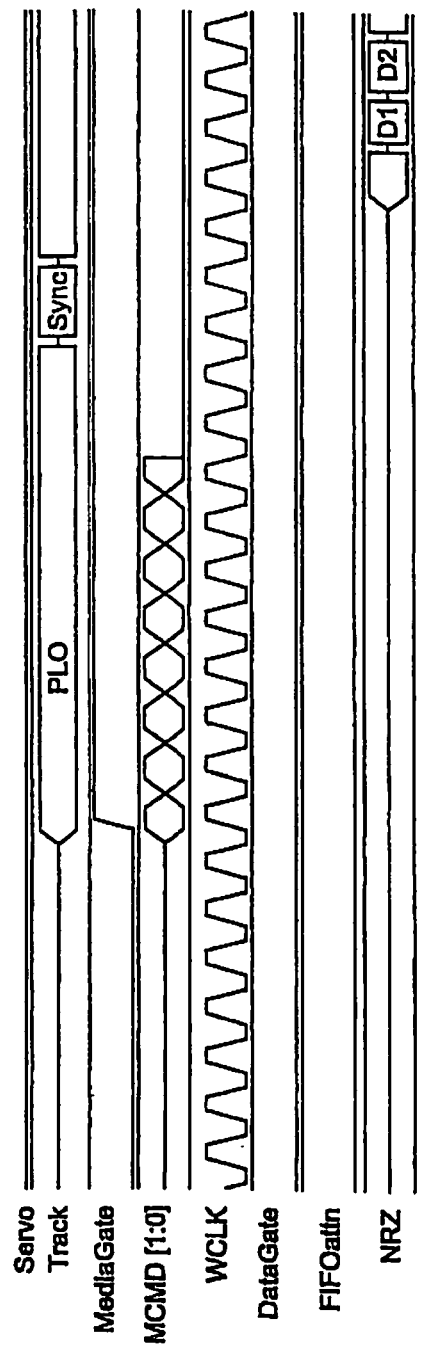

Exemplary timing diagrams of various signals employed in high latency read operation is illustrated in FIG. 5. FIG. 5(a) illustrates the overall timing of signals including the interface signals in the read operation. The servo signal and track signal function as explained above. FIG. 5(b) is a "blow up" of that portion of FIG. 5(a) showing MCMD information transfer which occurs over the "PLO" field which is the period that RDC acquires phase lock to the incoming track signal. FIG. 5(c) is a "blow up" of that portion of FIG. 5(a) illustrating DCMD transfer which occurs over the beginning of the data transfer between HDC and RDC indicated by the rising edge of the DataGate signal.

The R/W channel can read data from the medium, after receiving the size information and the "New" or "Cont" command. With the high latency R/W channel of the present invention, FIFOattn will be asserted by the R/W channel if its FIFO is ready to transfer data. The HDC starts receiving data after detecting FIFOattn in the asserted state. The R/W channel de-asserts FIFOattn one byte of data before an underrun condition occurs. After FIFOattn is de-asserted, the HDC enters a pause state in which data is not received. The R/W channel provides DCMD information when asserting FIFOattn again to allow data transfer to continue.

In transferring data from the R/W channel to the HDC with DCMD, the NRZ data is latched by the HDC on each rising edge of RCLK. The R/W channel provides an additional byte of mode information (DCMD) before regular data transfer. The DCMD values are set forth in Table 2 above. The R/W channel may use the Reset command to inform the HDC to reset/re-initialize the memory.

The interface signaling protocol of the present invention may be controlled by a processor operating in accordance with a program of instructions which may be in the form of software. Alternatively, the program of instructions may be implemented with discrete logic components, application specific integrated circuits (ASICs), digital signal processors, or the like. Based on the teachings herein, one skilled in the art would be able to implement an appropriate instruction program in either software or hardware for carrying out the interface signaling protocol of the present invention.

It should be readily apparent from the foregoing description that the interface of the present invention supports high read and write latencies of greater than one sector. In particular, with the additional Tag ID and control bits, interface 20 can support an R/W channel latency more than one sector long. The Tag ID advantageously allows the transfer of multiple noncontiguous sectors or out-of-order sectors. Moreover, the interface is also capable of supporting a split sector format and a multiple sector mark.

While embodiments of the invention have been described, it will be apparent to those skilled in the art in light of the foregoing description that many further alternatives, modifications and variations are possible. The invention described herein is intended to embrace all such alternatives, modifications and variations as may fall within the spirit and scope of the appended claims.

What is claimed is:

1. A system, comprising:
   a hard disk controller configured to i) transmit a first gate signal, a write clock signal, mode selection data, and first data to be stored on a storage medium, and ii) receive a read clock signal and second data stored on the storage medium, wherein the mode selection data includes control data associated with at least one of the first data and the second data; and
   a read/write channel configured to i) receive the first gate signal, the write clock signal, the mode selection data, and the first data, ii) transmit the read clock signal, iii) while the first gate signal is asserted during a read operation, transfer the second data from the storage medium to the hard disk controller based on the mode selection data and the read clock signal, and iv) while the first gate signal is asserted during a write operation, transfer the first data from the hard disk controller to the storage medium based on the mode selection data and the write clock signal,
   wherein the first gate signal is continuously asserted (i) during the read operation from a time subsequent to a beginning of the read operation to completion of the read operation and (ii) during the write operation from a time subsequent to a beginning of the write operation to completion of the write operation,
   wherein the first gate signal is asserted to control transfer of the mode selection data including the control data, and
   wherein the control data indicates whether the first data or the second data is continued from a previous sector or is associated with a new sector.

2. The system of claim 1, wherein the hard disk controller is configured to transmit the mode selection data using a mode selection bus.

3. The system of claim 1, wherein the hard disk controller is configured to transmit the first data and receive the second data using a data bus.

4. The system of claim 1, wherein the control data further indicates at least one of i) a byte size of the first data or the second data, ii) a location on the storage medium associated with the first data or the second data, and iii) a reset command.

5. The system of claim 1, wherein the hard disk controller is configured to transmit a second gate signal, wherein the first data and the second data are transferred while the second gate signal is asserted in addition to the first gate being asserted, and wherein i) during a write operation, the second gate signal is asserted prior to the first gate signal being asserted, and ii) during a read operation, the first gate signal is asserted and the mode selection data is transmitted prior to the second gate signal being asserted.

6. The system of claim 1, wherein the hard disk controller is configured to receive a buffer status signal indicating a status of a buffer of the read/write channel.

7. The system of claim 6, wherein the buffer status signal is asserted in response to the buffer becoming full during the write operation.

8. The system of claim 6, wherein the buffer status signal is asserted in response to the buffer being ready to receive data during the read operation.

9. A method, comprising:
   using a hard disk controller,
      transmitting a first gate signal, a write clock signal, mode selection data, and first data to be stored on a storage medium, and
      receiving a read clock signal and second data stored on the storage medium, wherein the mode selection data includes control data associated with at least one of the first data and the second data; and
   using a read/write channel,
      receiving the first gate signal, the write clock signal, the mode selection data, and the first data,
      transmitting the read clock signal,
      while the first gate signal is asserted during a read operation, transferring the second data from the storage medium to the hard disk controller based on the mode selection data and the read clock signal, and
      while the first gate signal is asserted during a write operation, transferring the first data from the hard disk controller to the storage medium based on the mode selection data and the write clock signal,
      wherein the first gate signal is continuously asserted (i) during the read operation from a time subsequent to a beginning of the read operation to completion of the read operation and (ii) during the write operation from a time subsequent to a beginning of the write operation to completion of the write operation,
      wherein the first gate signal is asserted to control transfer of the mode selection data including the control data, and
      wherein the control data indicates whether the first data or the second data is continued from a previous sector or is associated with a new sector.

10. The method of claim 9, further comprising transmitting the mode selection data using a mode selection bus.

11. The method of claim 9, further comprising transmitting the first data and receiving the second data using a data bus.

12. The method of claim 9, wherein the control data further indicates at least one of i) a byte size of the first data or the second data, ii) a location on the storage medium associated with the first data or the second data, and iii) a reset command.

13. The method of claim 9, further comprising, using the hard disk controller, transmitting a second gate signal,
   transferring the first data and the second data while the second gate signal is asserted in addition to the first gate signal being asserted; and
   during a write operation, asserting the second gate signal prior to the first gate signal being asserted; and
   during a read operation, asserting the first gate signal and transmitting the mode selection data prior to the second gate signal being asserted.

14. The method of claim 9, further comprising receiving, at the hard disk controller, a buffer status signal indicating a status of a buffer of the read/write channel.

15. The method of claim 14, further comprising asserting the buffer status in response to the buffer becoming full during the write operation.

16. The method of claim 14, further comprising asserting the buffer status signal in response to the buffer being ready to receive data during the read operation.

* * * * *